(12) United States Patent
Johnson

(10) Patent No.: US 8,326,667 B2
(45) Date of Patent: Dec. 4, 2012

(54) METHOD AND SYSTEM FOR STAFFING A CALL CENTER UTILIZING A TIME-BASED, GRADUATED SHRINK RAMP SCHEDULE

(75) Inventor: Jonathan W. Johnson, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 200 days.

(21) Appl. No.: 12/815,142

(22) Filed: Jun. 14, 2010

(65) Prior Publication Data
US 2011/0307283 A1  Dec. 15, 2011

(51) Int. Cl.
*G06Q 10/00* (2012.01)
(52) U.S. Cl. ........................................... 705/7.13
(58) Field of Classification Search .............. 705/7.13
See application file for complete search history.

(56) References Cited

U.S. PATENT DOCUMENTS

| | | | |
|---|---|---|---|
| 5,185,780 A * | 2/1993 | Leggett | 379/265.08 |
| 5,289,368 A * | 2/1994 | Jordan et al. | 705/7.13 |
| 5,325,292 A * | 6/1994 | Crockett | 705/7.18 |
| 5,799,286 A * | 8/1998 | Morgan et al. | 705/30 |
| 5,911,134 A * | 6/1999 | Castonguay et al. | 705/7.12 |
| 6,005,932 A * | 12/1999 | Bloom | 379/265.14 |
| 6,144,971 A * | 11/2000 | Sunderman et al. | 715/205 |
| 6,330,326 B1* | 12/2001 | Whitt | 379/265.13 |
| 6,611,726 B1* | 8/2003 | Crosswhite | 700/99 |
| 6,654,798 B1* | 11/2003 | Skibinski et al. | 709/220 |
| 6,665,395 B1* | 12/2003 | Busey et al. | 379/265.09 |
| 6,675,151 B1* | 1/2004 | Thompson et al. | 705/7.14 |
| 6,694,374 B1* | 2/2004 | McGloin et al. | 709/238 |
| 6,711,253 B1* | 3/2004 | Prabhaker | 379/265.01 |
| 6,985,872 B2* | 1/2006 | Benbassat et al. | 705/7.14 |
| 7,103,562 B2* | 9/2006 | Kosiba et al. | 705/7.38 |
| 7,272,817 B1* | 9/2007 | Hinkle et al. | 717/104 |
| 7,394,345 B1* | 7/2008 | Ehlinger et al. | 340/5.21 |
| 7,478,051 B2* | 1/2009 | Nourbakhsh et al. | 705/7.37 |
| 7,587,330 B1* | 9/2009 | Shan | 705/7.31 |
| 7,650,293 B2* | 1/2010 | Kiran et al. | 705/7.25 |
| 7,788,598 B2* | 8/2010 | Bansal et al. | 715/810 |
| 7,848,947 B1* | 12/2010 | McGloin et al. | 705/7.42 |
| 7,908,167 B1* | 3/2011 | Crum et al. | 705/7.42 |
| 7,945,468 B1* | 5/2011 | Bernasconi et al. | 705/7.13 |
| 7,962,356 B2* | 6/2011 | Bollenbeck et al. | 705/7.13 |
| 8,015,042 B2* | 9/2011 | Seetharaman et al. | 705/7.12 |
| 8,027,849 B2* | 9/2011 | Johnson et al. | 705/2 |
| 8,046,254 B2* | 10/2011 | Kosiba et al. | 705/7.38 |
| 8,085,926 B2* | 12/2011 | Boughton et al. | 379/265.02 |

(Continued)

OTHER PUBLICATIONS

Durr, William, Spreadsheets and Workforce Management—An Odd Couple Blue Pumpkin Software, White paper, 2004.*

(Continued)

*Primary Examiner* — Scott L Jarrett
(74) *Attorney, Agent, or Firm* — Dierker & Associates, P.C.

(57) ABSTRACT

A method for staffing a call center involves, via a processor at the call center, generating a work schedule of a call center advisor for a then-current work day, the work schedule including i) information related to at least one planned activity, and ii) information related to at least one shrink activity, the information related to the at least one shrink activity being forecasted from a time-based, graduated ramp schedule. The method further involves, via the processor, utilizing the work schedule to determine an appropriate number of call center advisors for the call center throughout a future work day.

12 Claims, 3 Drawing Sheets

102

| | FILE | METRIC | 0 | 1 | 2 | 3 | 4 | 5 | 6 | 7 | 8 | 9 | 10 | 11 |
|---|---|---|---|---|---|---|---|---|---|---|---|---|---|---|
| F₁ | 8:00 | SHRINK EXCEPTION TIME | 22 | 43 | 44 | 46 | 52 | 52 | 52 | 51 | 55 | 48 | 41 | 33 |
| | FINAL SCHED FILE | SHRINK EXCEPTION TIME | 30 | 60 | 65 | 70 | 65 | 90 | 95 | 100 | 115 | 110 | 100 | 90 |
| | | | 27% | 28% | 32% | 34% | 39% | 42% | 46% | 49% | 52% | 56% | 59% | 63% |
| | FILE | METRIC | | 0 | 1 | 2 | 3 | 4 | 5 | 6 | 7 | 8 | 9 | 10 |
| F₂ | 8:30 | SHRINK EXCEPTION TIME | | 45 | 46 | 48 | 56 | 55 | 55 | 54 | 59 | 53 | 44 | 40 |
| | FINAL SCHED FILE | SHRINK EXCEPTION TIME | | 60 | 65 | 70 | 85 | 90 | 90 | 100 | 115 | 110 | 100 | 90 |
| | | | | 25% | 29% | 31% | 34% | 39% | 42% | 46% | 49% | 52% | 56% | 56% |
| | FILE | METRIC | | | 0 | 1 | 2 | 3 | 4 | 5 | 6 | 7 | 8 | 9 |
| F₃ | 9:00 | SHRINK EXCEPTION TIME | | | 49 | 49 | 58 | 59 | 58 | 58 | 62 | 56 | 48 | 40 |
| | FINAL SCHED FILE | SHRINK EXCEPTION TIME | | | 65 | 70 | 85 | 90 | 95 | 100 | 115 | 110 | 100 | 90 |
| | | | | | 25% | 30% | 32% | 34% | 39% | 42% | 46% | 49% | 52% | 56% |

U.S. PATENT DOCUMENTS

| | | | |
|---|---|---|---|
| 8,140,366 B2 * | 3/2012 | Adams et al. | 705/7.12 |
| 8,140,369 B2 * | 3/2012 | Paul et al. | 705/7.14 |
| 2002/0040313 A1 * | 4/2002 | Hunter et al. | 705/9 |
| 2002/0143597 A1 | 10/2002 | Andre et al. | |
| 2002/0143599 A1 * | 10/2002 | Nourbakhsh et al. | 705/9 |
| 2003/0065548 A1 * | 4/2003 | Schmidt | 705/9 |
| 2004/0064567 A1 * | 4/2004 | Doss et al. | 709/228 |
| 2004/0093256 A1 * | 5/2004 | Garcia et al. | 705/9 |
| 2005/0182698 A1 * | 8/2005 | Garcia et al. | 705/30 |
| 2006/0147025 A1 * | 7/2006 | Dezonno et al. | 379/265.02 |
| 2008/0037760 A1 | 2/2008 | Boughton et al. | |
| 2008/0172275 A1 * | 7/2008 | Ramanujan et al. | 705/8 |
| 2008/0306762 A1 * | 12/2008 | James | 705/2 |
| 2010/0153161 A1 * | 6/2010 | Kiran et al. | 705/8 |
| 2010/0198647 A1 * | 8/2010 | Bowers et al. | 705/9 |
| 2010/0274637 A1 * | 10/2010 | Li et al. | 705/11 |
| 2010/0312604 A1 * | 12/2010 | Mitchell et al. | 705/9 |

OTHER PUBLICATIONS

Barnard, Patrick, Shrinkage a Major Call Center Management Challenge Call Center Management, Apr. 24, 2009.*

Reynolds, Penny, Hire math: How many contact center reps do you really need? Multichannel Merchant, Sep. 2005.*

Barber, Gerry et al., Two Ways to Think About Shrinkage Call Center Magazine, vol. 17, No. 6, Jun. 2004.*

Cleveland, Brad, Where is Everybody? How to Accurately Predict Schedule Shrinkage—Ever wonder aloud where your agents are? Rostered Staff Factor (RSF) or shrinkage calculations can help, Call Center Magazine, vol. 20, No. 6, Jun. 2007.*

Hughes, Colette, Four steps to accurate call-center staffing HR Magazine, vol. 40, No. 4, Apr. 1995.*

Call Center Metrics: Fundamentals of Call Center Staffing and Technologies NAQC Issue Paper, 2010.*

Call Center Management Axzo Press, LLC., Jan. 2001, ISBM: 0-619-14860-8.*

Easton, Fred F. et al., Labor scheduling with employee turnover and absenteeism SUrface, Syracuse University, Whitman School of Management, Jan. 1, 2002.*

Thompson, Gary M., Labor Schedule, Part 2: Knowing How Many On-duty Employees to Schedule Cornell Hotel and Restaurant Administration Quarterly, vol. 39, No. 6, Dec. 1998.*

PrimeTime F&S User's Guide, Version 1.3 Blue Pumpkin Software, inc., 1997.*

Hur, Daesik et al., Real-time schedule adjustment decisions: a case study Omega, vol. 32, 2004.*

Shen, Haipeng et al., Interday Forecasting and Intraday Updating of Call Center Arrivals Manufactring & Service Operations Management, vol. 10 No. 3, Summer 2008.*

Easton, Fred F. et al., Schedule Recovery: Unplanned Absences in Service Operations Decision Sciences, vol. 26, No. 2, Aug. 2005.*

Whitt, Ward, Staffing a Call Center With Uncertain Arrival Rate and Absenteeism Production and Operations Management, vol. 15, No. 1, Spring 2006.*

Cox, Denis, Keep call centers on track by monitoring agent adherence Enterprise Networks & Servers, vol. 11, No. 5, May 2005.*

Thompson, Gary M., Labor Scheduling Part 4: Controlling Workforce Schedules in Real Time Cornell Hotel and Restaurant Administration Quarterly, vol. 40 No. 3, Jun. 1999.*

Mehrotra, Vijay et al., Intelligent Procedures for Intra-Day Updating of Call Center Agent Schedules Production and Operations Management, vol. 19, No. 3, May/Jun. 2010.*

Mehrotra, Vijay et al., Intelligent Procedures for Intra-Day Updating of Call Center Agent Schedules (presentation) University of Montreal Call Center Workshop, May 2006.*

Ivancevich, John M., Predicting absenteeism from prior absence and work attitudes Academy of Management Journal, vol. 28, No. 1, Mar. 1985.*

Carbo, Valaries, Snow, Sickness & Other Aggravations: Adjusting for Daily Staffing Surprises Pipkins.com, Jul. 8, 2007, Retreieved from Archive.org Jun. 12, 2010.*

* cited by examiner

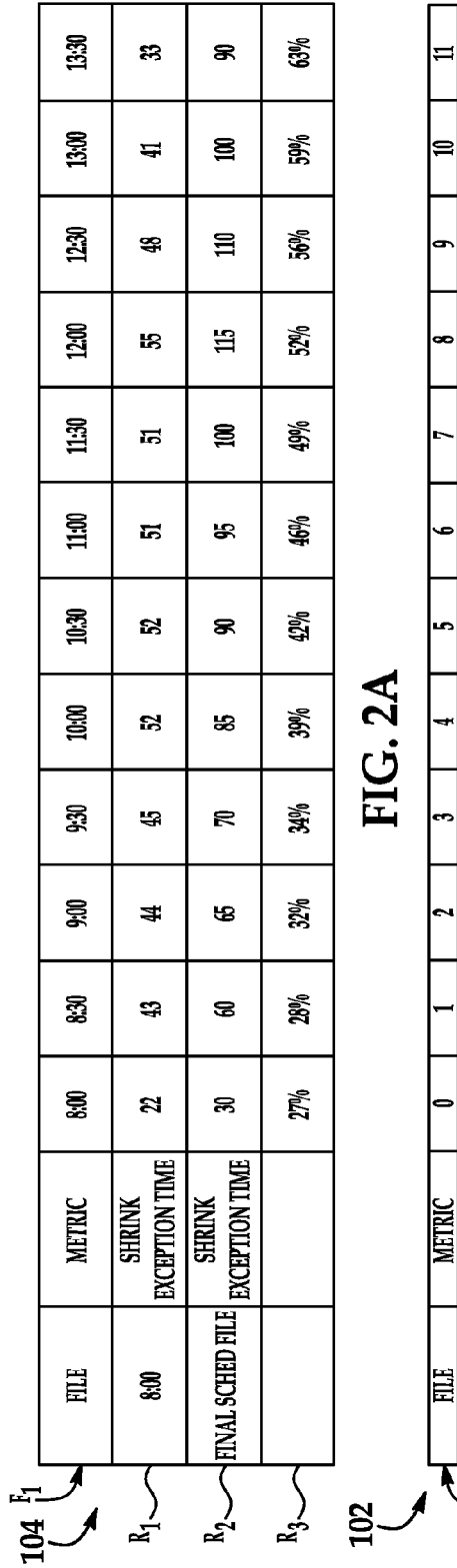

FIG. 2C

| | 0 | 1 | 2 | 3 | 4 | 5 | 6 | 7 | 8 | 9 | 10 | 11 |
|---|---|---|---|---|---|---|---|---|---|---|---|---|
| INITIAL SCHED SHRINK TIME VS FINAL SCHED SHRINK TIME | 27% | 29% | 32% | 34% | 39% | 42% | 46% | 49% | 52% | 56% | 59% | 63% |
| | | 25% | 29% | 31% | 34% | 39% | 42% | 46% | 49% | 52% | 56% | 56% |
| | | 25% | 25% | 30% | 32% | 34% | 39% | 42% | 46% | 49% | 52% | 56% |

FIG. 2D

| | 0 | 1 | 2 | 3 | 4 | 5 | 6 | 7 | 8 | 9 | 10 | 11 |
|---|---|---|---|---|---|---|---|---|---|---|---|---|
| FILE 1 | 0.290 | 0.363 | 0.402 | 0.459 | 0.358 | 0.390 | 0.523 | 0.456 | 0.551 | 0.434 | 0.537 | 0.603 |
| FILE 2 | 0.534 | 0.265 | 0.576 | 0.301 | 0.601 | 0.599 | 0.341 | 0.564 | 0.489 | 0.403 | 0.466 | 0.335 |
| FILE 3 | 0.350 | 0.563 | 0.585 | 0.557 | 0.562 | 0.358 | 0.520 | 0.556 | 0.637 | 0.404 | 0.260 | 0.293 |
| FILE 4 | 0.489 | 0.395 | 0.461 | 0.353 | 0.321 | 0.429 | 0.491 | 0.408 | 0.368 | 0.308 | 0.490 | 0.492 |
| FILE 5 | 0.447 | 0.339 | 0.528 | 0.387 | 0.511 | 0.563 | 0.645 | 0.516 | 0.336 | 0.319 | 0.642 | 0.520 |
| FILE 6 | 0.376 | 0.596 | 0.331 | 0.325 | 0.446 | 0.502 | 0.288 | 0.641 | 0.491 | 0.305 | 0.556 | 0.485 |
| FILE 7 | 0.619 | 0.399 | 0.463 | 0.326 | 0.624 | 0.579 | 0.628 | 0.547 | 0.305 | 0.345 | 0.512 | 0.431 |
| FILE 8 | 0.517 | 0.293 | 0.486 | 0.482 | 0.476 | 0.375 | 0.310 | 0.512 | 0.368 | 0.308 | 0.584 | 0.606 |
| FILE 9 | 0.463 | 0.629 | 0.478 | 0.420 | 0.295 | 0.376 | 0.532 | 0.465 | 0.355 | 0.312 | 0.340 | 0.347 |
| FILE 10 | 0.609 | 0.434 | 0.500 | 0.545 | 0.534 | 0.459 | 0.392 | 0.362 | 0.419 | 0.334 | 0.582 | 0.479 |
| FILE 11 | 0.624 | 0.353 | 0.400 | 0.288 | 0.266 | 0.572 | 0.514 | 0.546 | 0.551 | 0.599 | 0.318 | 0.292 |
| FILE 12 | 0.431 | 0.403 | 0.617 | 0.620 | 0.487 | 0.262 | 0.437 | 0.411 | 0.610 | 0.474 | 0.559 | 0.376 |
| FILE 13 | 0.477 | 0.371 | 0.448 | 0.276 | 0.300 | 0.379 | 0.359 | 0.477 | 0.436 | 0.294 | 0.360 | 0.532 |
| FILE 14 | 0.481 | 0.299 | 0.497 | 0.589 | 0.461 | 0.595 | 0.479 | 0.647 | 0.540 | 0.569 | 0.635 | 0.524 |
| ... | | | | | | | | | | | | |
| FILE 1440 | 0.485 | 0.478 | 0.375 | 0.501 | 0.427 | 0.416 | 0.436 | 0.571 | 0.342 | 0.560 | 0.281 | 0.450 |
| GSRS | 0.267 | 0.283 | 0.323 | 0.343 | 0.388 | 0.422 | 0.463 | 0.490 | 0.522 | 0.554 | 0.590 | 0.633 |

US 8,326,667 B2

METHOD AND SYSTEM FOR STAFFING A CALL CENTER UTILIZING A TIME-BASED, GRADUATED SHRINK RAMP SCHEDULE

TECHNICAL FIELD

The present disclosure relates generally to methods for staffing a call center.

BACKGROUND

Call centers often employ service advisors to service voice calls from subscriber vehicles. The number of service advisors on duty during predefined hours of a work day typically depends, at least in part, on the volume of calls received. In some instances, adjustments to the number of service advisors on duty may be required under some circumstances.

SUMMARY

A method for staffing a call center involves, via a processor at the call center, generating a work schedule of a call center advisor for a then-current work day, the work schedule including i) information related to at least one planned activity, and ii) information related to at least one shrink activity, the information related to the at least one shrink activity being forecasted from a time-based, graduated ramp schedule. The method further involves, via the processor, utilizing the work schedule to determine an appropriate number of call center advisors for the call center throughout the then-current work day.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A through 2D together illustrate an example of a method for generating a time-based, graduated shrink ramp schedule.

DETAILED DESCRIPTION

Figure 1:
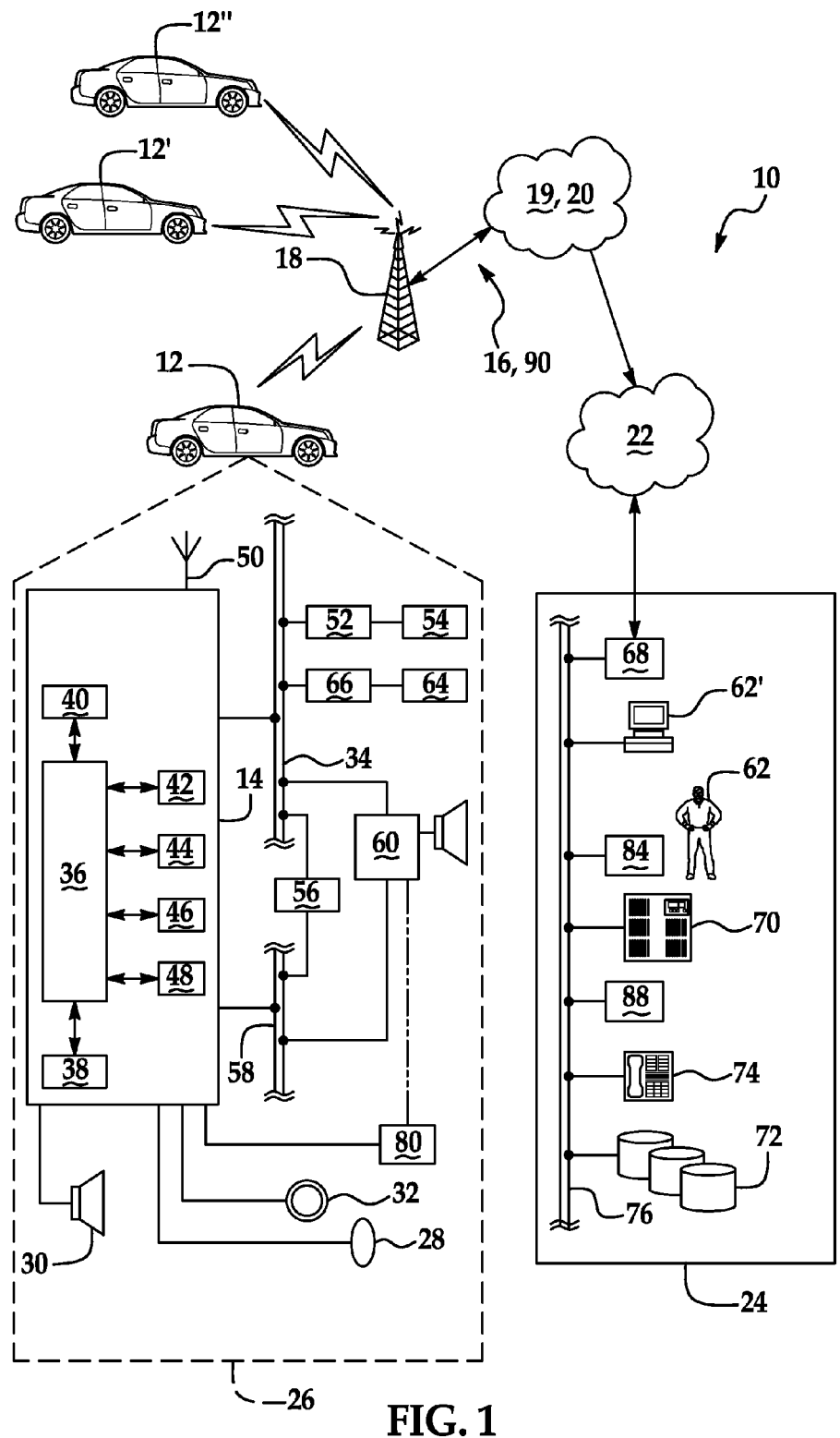
FIG. 1 is a schematic diagram depicting an example of a system for updating a database.

Example(s) of the method disclosed herein may be used to staff a call center with an appropriate number of service advisors throughout a work day. More specifically, the staffing method takes into account an amount of shrink time used by one or more service advisors on a then-current work day to forecast a number of service advisors needed to staff a call center on a subsequent work day. The forecasting of the number of service advisors needed ensures that an appropriate number of service advisors is available to service calls at various hours of the work day. This advantageously improves the overall operating efficiency of the call center, while still providing acceptable levels of service for incoming subscriber calls.

As used herein, a "shrink activity" refers to an activity engaged in by a service advisor that is considered to be unplanned (i.e., an activity that is not thought out or prepared for in advance). Examples of shrink activities include, but are not limited to, calling in sick, arriving to work late, leaving work early, taking one or more unexpected breaks throughout the work day, taking longer than the time allotted for a lunch break, being absent from his/her workstation for unforeseen circumstances (e.g., visiting a friend at the work place, taking additional bathroom breaks, etc.) and/or the like. The time that the service advisor is engaged in the shrink activity is referred to herein as "shrink time".

It is to be understood that any of the examples of the shrink activities recited above may, in certain instances, be considered to be a planned activity (i.e., an activity that is thought out or prepared for in advance). In these instances, the advisor is aware of the shrink activity, and notifies his/her supervisor, boss, scheduling department or other suitable person at the call center that he/she will be engaged in the activity. For instance, if the advisor knows that he/she has a doctor's appointment at 8:00 am and informs the proper person at the call center of the appointment, the fact that he/she arrives at work late (e.g., at 9:30 am as opposed to his/her 8:00 am starting time) is considered to be a planned activity that is already accounted for by the call center for staffing purposes. As a result, the amount of time that the advisor is engaged in this particular activity is not considered to be shrink time as defined above, because it is accounted for. If, however, the advisor arrives at 10:00 am rather than 9:30 am, the additional half hour of the advisor's absence is considered to be shrink time, at least in part because the advisor's absence during this time period was not planned for or accounted for by the call center. Other examples of planned activities include, but are not limited to, clock time and duration allotted for servicing voice calls at the call center, clock time and duration allotted for pre-scheduled breaks such as lunch, clock time and duration for pre-scheduled meetings, clock time and duration for pre-scheduled classes or seminars, and/or the like.

Further, a "work schedule" refers to a chronological list of appointments, meetings, and/or commitments of the service advisor for a particular work day. The work schedule may include, for example, a start time for the work day, an end time for the work day, the clock time and duration for breaks throughout the work day, and the clock time and duration for lunch. In some instances, the work schedule may further include various planned activities of the advisor, such as, e.g., the clock time and duration of a meeting with the advisor's supervisor, the clock time and duration of a pre-planned doctor's appointment, a pre-planned early leave time for that particular work day, and/or the like. A predicted work schedule is one that is prepared prior to the beginning of a work day and sets forth planned activities and may also set forth some non-planned activities that are believed will or are likely to take place. A final work schedule is a record of the actual work schedule that was worked on a particular day.

It is to be understood that, as used herein, the term "user" includes a vehicle owner, operator, and/or passenger, and this term may be used interchangeably with the term subscriber/service subscriber.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

An example of a system 10 that may be used to accomplish the method disclosed herein is generally depicted in FIG. 1. In this example, the system 10 includes a call center 24 in selective and operative communication with one or more subscriber vehicles (three of which are shown as 12, 12', 12" in FIG. 1). Although further detail of the call center 24 and the vehicles 12, 12', 12" will be described below in conjunction with FIG. 1, the call center 24 is generally configured to service one or more calls from the subscriber vehicles 12, 12', 12". It is to be understood, however, that the staffing method disclosed herein may otherwise be used for any system where calls are serviced by a call center, some non-limiting examples of which include credit card companies, phone companies, cable companies, home and/or automotive repair companies, retail stores, and/or the like.

Referring now to FIG. 1, one non-limiting example of a system 10 for staffing a call center 24 includes a number of subscriber vehicles (vehicles 12, 12', 12" shown), where each vehicle 12, 12', 12" includes a respective telematics unit (such as the telematics unit 14 associated with the vehicle 12). The system 10 also includes a carrier/communication system 16 (including, but not limited to, one or more cell towers 18, one or more base stations 19 and/or mobile switching centers (MSCs) 20, and one or more service providers (not shown)), one or more land networks 22, and one or more telematics service call/data centers 24. In an example, the carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicles 12, 12', 12" are mobile vehicles such as motorcycles, cars, trucks, recreational vehicles (RV), boats, planes, etc., and each is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle (such as the vehicle 12 shown in FIG. 1) to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device that provides a variety of services, both individually and through its communication with the call/data center 24. The call/data center 24 includes at least one facility that is owned and operated by the telematics service provider. The telematics unit 14 generally includes an electronic processing device 36 operatively coupled to one or more types of electronic memory 38, a cellular chipset/component 40, a vehicle data upload (VDU) unit 41, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or a set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In a non-limiting example, the electronic processing device 36 (also referred to herein as a processor) includes software programs having computer readable code to initiate and/or perform one or more steps of the methods disclosed herein. For instance, the software programs may include computer readable code for determining whether or not a detected stationary object is missing from a database stored in the electronic memory 38.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services alone or in conjunction with the call/data center 24, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when such services are obtained from the call/data center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and telematics service data/call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. For instance, one of the buttons 32 may be an electronic pushbutton used to initiate voice communication with the telematics service provider data/call center 24 (whether it be a live advisor 62 or an automated call response system 62'), e.g., to request emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66, are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the data/call center 24 (when transmitted thereto from the telematics unit 14) to determine the operation of the vehicle 12. Non-limiting example sensor interface modules 66 include powertrain control, climate control, body control, and/or the like. It is to be understood that some of the data received from the other vehicle sensors 64 may also trigger one or more of the methods disclosed herein. Such other data may include, for example, data indicating that an airbag has been deployed, data pertaining to a sudden deceleration (e.g., upon colliding with another object such as another vehicle), data indicting a sudden increase in pressure exerted on the brake pedal (e.g., upon braking suddenly when attempting to avoid a collision), data pertaining to a sudden decrease in tire pressure (e.g., a flat tire while traveling down a road segment), or the like.

In one non-limiting example, the vehicle hardware 26 also includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The electronic memory 38 of the telematics unit 14 may be configured to store data associated with the various systems of the vehicle 12, vehicle operations, vehicle user preferences and/or personal information, and the like.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

The call/data center 24 of the telematics service provider is designed to provide the vehicle hardware 26 with a number of different system back-end functions. According to the example shown in FIG. 1, the call/data center 24 generally includes one or more switches 68, servers 70, databases 72, live and/or automated advisors 62, 62', processing equipment (or processor) 84, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The database(s) 72 is configured to store information related to various call/data center 24 processes, as well as information pertaining to the subscribers. In an example, the information pertaining to the subscribers may be stored as a profile, which may include, e.g., the subscriber's name, address, home phone number, cellular phone number, electronic mailing (e-mail) address, etc.).

The processor 84, which is often used in conjunction with the computer equipment 74, is generally equipped with suitable software and/or programs enabling the processor 84 to accomplish a variety of call/data center 24 functions. Such software and/or programs are further configured to perform one or more steps of the staffing method disclosed herein. The various operations of the call/data center 24 are carried out by one or more computers (e.g., computer equipment 74) programmed to carry out at least some of the tasks of the method(s) disclosed herein. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the call/data center 24 may be any central or remote facility, manned or unmanned, mobile or fixed, to or from which it is desirable to exchange voice and data communications. As such, the live advisor 62 may be physically present at the call/data center 24 or may be located remote from the call/data center 24 while communicating therethrough.

Each live advisor 62 has his/her own workstation 88, which includes one or more computers linked to the bus 76 and one or more telephones. The computer(s) of each workstation 88 is/are capable of recording data files of an associated advisor's real-time schedule throughout each work day. More particularly, data files are created that include activities and time stamps associated therewith throughout a particular work day. The data files may be in text format or the data may be encoded in any suitable code. These data files include planned and unplanned or shrink activities. All of the day's files are transmitted at the end of the day to the main processor 84, which is configured to combine the data from all of the advisors 62, calculate the actual shrink time for the entire call center 24 on that particular day, and determine the variance between predicted shrink time and actual shrink time on that particular day. This information is then used by the processor 84 to calculate the following day's predicted schedule, and is ultimately used to create a shrink ramp schedule. The generation of the shrink ramp schedule is discussed further hereinbelow with reference to FIGS. 2A through 2D.

Briefly, the graduated shrink ramp schedule disclosed herein is based upon shrink time variance calculated for relatively short predetermined time intervals (e.g., 30 minutes). The long duration of a work day, and unexpectedly long absences of employees causes a ramp in the schedule. For example, a sick employee leaving for the day affects the remainder of the day. Unaccounted for shrink time (e.g., due to failed backups, etc.) does not enable the call center 24 to properly create new schedules that accommodate for the unforeseen shrink activities. The method disclosed herein records actual activities at predetermined intervals throughout the day, and uses the past information to assess the accuracy of the staffing and to close the gap between predicted shrink events and actual shrink events so that the call centers 24 are not understaffed in the event of an unexpected shrink activity. More specifically, the graduated shrink ramp schedule reflects a statistical calculation or distribution of shrink time based upon past data, and these numbers may be used to determine an appropriate number of advisors to be staffed in the coming days. The statistical calculation may utilize averaging, weighted averaging, and filtering techniques.

The telephones at the advisor's workstation 88 are used to receive and make service calls with one or more subscribers.

The communications network provider 90 generally owns and/or operates the carrier/communication system 16. In an example, the communications network provider 90 is a cellular/wireless service provider (such as, for example, VERIZON WIRELESS®, AT&T®, SPRINT®, etc.). It is to be understood that, although the communications network provider 90 may have back-end equipment, employees, etc. located at the telematics service provider data/call center 24, the telematics service provider is a separate and distinct entity from the network provider 90. In an example, the equipment, employees, etc. of the communications network provider 90 are located remote from the data/call center 24. The communications network provider 90 provides the user with telephone and/or Internet services, while the telematics service provider provides a variety of telematics-related services (such as, for example, those discussed hereinabove). It is to be understood that the communications network provider 90 may interact with the data/call center 24 to provide services to the user.

It is to be understood that in some instances, the telematics service provider operates a data center 24, which receives voice or data calls, analyzes the request associated with the voice or data call, and transfers the call to an application specific call center (not shown), which services the call. It is to be understood that the application specific call center may include all of the components of the data center 24, but is a dedicated facility for addressing specific requests, needs, etc. Examples of such application specific call centers are emergency services call centers, navigation route call centers, in-vehicle function call centers, or the like. Since the advisors 62 assist callers in obtaining various services, it is desirable to have the call center 24 staffed appropriately for the number of calls received.

Examples of the method for staffing the call center 24 will now be described. It is to be understood that all of the steps of the staffing method are performed at the call center 24 via one or more software programs and/or algorithms that are executable by a computer, such as the processor 84. As such, the staffing method disclosed herein is an automated process, whereby no manual intervention (e.g., by one or more members of the call center 24 staff) is required to perform the method steps.

Further, the staffing method disclosed herein is an efficient way of generating a predicted work schedule, recording the actually performed work schedule, and from this data be able to check the accuracy of the staffing for the time intervals on a particular day. In some instances, the staffing methods may be used to make appropriate adjustments to the predicted work schedule throughout the work day. In instances where adjustments are made to the predicted work schedule (e.g., an additional one or two hours of overtime at the end of the advisor's shift), these adjustments are first proposed to the call center advisor 62 and, if agreed upon, are incorporated into the advisor's work schedule. The adjustments may be incorporated into the advisor's schedule via suitable scheduling software programs executed by the processor 84 at the call center 24.

The software programs and/or algorithms utilize actual data or information pertaining to various planned and unplanned (or shrink) activities of one or more service advisors 62 to update the predicted work schedule. Both the predicted work schedules and the actual work schedules are used to ultimately generate a predicted work schedule for a particular service advisor 62 for a subsequent work day. Typically, a predicted work schedule is generated for each service advisor 62 employed at the call center 24, and then all of the predicted and actual work schedules (i.e., one for each of the service advisors 62) are utilized, by the processor 84, to generate individual ramp schedules for particular times of the work day. These individual ramp schedules are then used to create a graduated shrink ramp schedule. The graduated shrink ramp schedule is utilized to check the accuracy of staffing and to make adjustments to the staffing at a particular call center 24 if necessary or desirable based upon the data. The daily data collected to generate the graduated shrink ramp schedule may also be used to i) adjust a then-current work day's schedule if needed due, at least in part, to one or more occurrences of shrink activities, and/or ii) generate a new work schedule for a service advisor 62 for a subsequent work day. Further details of the single ramp schedules and the determining of the graduated ramp schedule from the single ramp schedules will be described below in conjunction with FIG. 2D. Generally, the graduated ramp schedule is ultimately used to anticipate an appropriate number of advisors for the call center 24 needed for the subsequent work day(s) and so that staff may be notified of changes due to consistent shrink activities. The graduated shrink ramp schedule allows the call center 24 staffing person to give the advisors notice, so they can arrange for childcare etc. in the event of shrink activities.

The generation of the time-based, graduated shrink ramp schedule 200 (see FIG. 2D) begins by creating a first ramp schedule 102 (shown in FIG. 2B), which is created from i) the predicted work schedules of all of the call center advisors 62 for a particular work day, where each predicted work schedule includes planned activities of the respective advisor alone, and ii) the actual activities engaged in by the call center advisors 62 during that particular work day.

Prior to creating the first ramp schedule 102, the predicted work schedule and the actual activities are plotted in a table 104 to determine the percent variance for each of the time intervals of the day. This is shown in FIG. 2A. For example, the predicted work schedule (shown in row R1) for all of the advisors 62 working from 8:00 am to 8:30 am includes 22 minutes of shrink time, and the actual shrink time recorded (shown in row R2) during this time interval is 30 minutes. As such, the percent variance (shown in Row R3) during the 8:00-8:30 time frame for that day is 27%. The calculation of the percent variance is discussed further hereinbelow.

The predicted work schedule of a number of call center (or service) advisors 62 for a work day is generated using the appropriate software programs executable by the processor 84. The predicted work schedule for each respective call center advisor 62 includes i) information related to at least one planned activity, and ii) information related to at least one anticipated shrink activity. As mentioned above, the planned activities include those activities that were prepared for or known in advance, such as planned time for servicing subscriber calls, a lunch hour, a break time, etc. In the predicted work schedule, the shrink activities are simply estimated or anticipated unplanned events, such as leaving work early, taking an unexpected break in the middle of the work day, etc. An example of a predicted work schedule for call center advisor A is shown below:

| Call Center Advisor A - work schedule for Jun. 15, 2010 | |
|---|---|
| 8:00 am | Arrival time |
| 8:00-8:30 am | Meeting with supervisor |
| 8:30-10:30 am | Service calls |
| 10:30-11:00 am | shrink activity |
| 11:00-12:00 pm | Service calls |
| 12:00-1:00 pm | Lunch |
| 1:00-3:00 pm | Service calls |
| 3:00-3:15 pm | Break |
| 3:15-3:30 pm | Shrink activity |
| 3:30-5:00 pm | Service calls |
| 5:00 pm | Leave time |

In the predicted schedule, the information related to the shrink activities is, for example, predicted or forecasted from a ramp schedule determined at least from information taken from the previous work day's schedule. For instance, information related to shrink activities (e.g., the type of shrink activity, the time spent while engaged in the activity, and the like) engaged in by the call center advisors 62 on at least the previous work day is utilized, by the processor 84, to generate the predicted work schedule.

The actual activities are, for example, recorded throughout the day as such activities occur. The workstation 88 of the advisor 62 is configured to submit, to the database(s) 72, information making up the previously mentioned data files at predetermined intervals, and whenever a shrink activity is detected. The database(s) 72 collects the information, summarizes the information into the data files, and stores the data files therein. For example, the activity recording data files may be created every half hour after an advisor 62 logs in until the advisor 62 logs out. A recording may also be made, e.g., whenever the advisor 62 leaves his/her workstation during a time interval that was not accounted for in the advisor's predicted work schedule. In an example, the workstation 88 records the time when the advisor 62 indicates he/she is leaving the workstation 88 (via, e.g., a mouse click of an icon on the advisor's work page, where the icon represents the fact that the advisor 62 is away from his/her workstation 88), or the workstation 88 records the time after the screensaver appears on the monitor. The workstation 88 will also record the time when the advisor 62 returns, which can be detected, for example, by a mouse click on another icon on the advisor's work page, where the other icon represents the fact that the advisor 62 has returned, or by removing the screensaver.

The data files in each group are text or other suitable files that are dynamically and sequentially generated throughout the work day by the processor 84. For each advisor 62, each data file is time-stamped and includes information pertaining to an activity (which may or may not be planned) of the advisor's work schedule for the then-current work day. For instance, one data file in the group may include information pertaining to a planned activity for call service time between the hours of 9:00 am to 10:00 am, another data file may include information pertaining to a planned break time from 10:01 am to 10:10 am, and yet another data file may include information pertaining to shrink time from 2:00 pm to 2:04 pm. In an example and as mentioned above, the shrink time is measured whenever the advisor 62 leaves his/her workstation 88 during a time period that he/she should otherwise be at the workstation 88. Of course, other data files may be generated so that all of the time is accounted for throughout the work day.

These generated individual data files (which are indicative of the actual activities that are performed in real time throughout the work day) are stored in the appropriate advisor profile at the call center 24. The storage of these files may take place, for example, every half hour, hour, or at another desired time interval throughout this work day, or each time a new data file is created. These data files are stored, for example, in one of the databases 72.

Once the then-current work day is finished, a final work schedule (or record) is generated, via the workstation 88 or via the main processor 84, for each call center advisor 62. These final work schedules are individually based, at least in part, on the respective group of stored individual data files for the advisor 62 on the work day. As such, the final work schedule represents the activities actually performed by the advisor 62 on the then-current work day (which may, in some cases, deviate from the advisor's original predicted work schedule for that work day). In an example, each final work schedule includes a complete set of work information (e.g., time spent on phone calls, time spent in meetings, etc.) of the call center advisor 62 associated therewith for the then-current work day, as well as all of the time that the advisor 62 was engaged in shrink activities (which is referred to herein as "shrink time" or "shrink exception time"). The final work schedules are stored as, e.g., data files in the appropriate advisor profiles in the database 72 at the call center 24.

Once all of the final work schedules (i.e., for all of the advisors 62 that worked that day) have been created, the shrink time (if any) from each of these data files is parsed into the predetermined time intervals. In the examples shown in the FIG. 2 series, the shrink time is parsed into 30 minute time intervals. It is to be understood, however, that other time intervals may be applied, such as, for example, 10 minutes, 60 minutes, or the like. Thereafter, the shrink time that occurred within each of the time intervals for all of the final work schedules (i.e., for all of the advisors 62) is added up and recorded (e.g., from 8:00 am to 8:30 am, the shrink time is 30 minutes). An example of the actual recorded shrink time from the final work schedules is shown in the second row R2 of the table 104 depicted in FIG. 2A.

The table 104 also includes the first row R1, which includes the predicted shrink time for each time interval for the day. As mentioned above, the predicted shrink times are originally based upon previous days shrink time data, previously generated shrink ramp schedules, or the like. In the example shown in FIG. 2A, the predicted shrink time for each time interval is based on data obtained prior to 8:00 am on that work day (i.e., actual shrink data that has been recorded for previous days).

The table 104 in FIG. 2A further includes a third row R3 containing the percent variance calculated from the predicted shrink time (see R1) and the actual shrink time (see R2) for each time interval. More specifically, the cumulative amount of shrink time (in minutes) during each 30 minute time interval throughout the work day predicted is shown in the first row R1, and the cumulative amount of shrink time (in minutes) during each 30 minute time interval throughout the work day deduced from the final work schedules is shown in the second row R2. The amount of shrink time between the two rows is compared, and then a percent variance of the compared shrink time is computed for each 30 minute time interval. In an example, the percent variance is computed via equation (A):

$$\% = \left( \frac{Shrink_{Predicted} - Shrink_{Observed}}{Shrink_{Observed}} \right) \times 100 \qquad \text{(Eqn. A)}$$

where the $Shrink_{Predicted}$ the amount of shrink time recorded from the predicted work schedules, and the $Shrink_{Observed}$ is the amount of shrink time recorded from the final work schedules (based upon the recorded data files). The percentage for each time interval is shown in the third row R3 of the table 104 shown in FIG. 2A.

It is to be understood that, as shown in FIG. 2A, the percent variance ramps up over time. This ramping up is due, at least in part, to the fact that long shrink periods affect the entire day, whereas short shrink periods may cause a blip, but generally do not alter the staffing for the duration of the day. In the example shown in FIG. 2A, the percent variance calculated for the time interval starting at 8:00 am shows that there was a 27% increase (comparing predicted versus actual shrink time) in the number of minutes spent engaged in shrink activities during that time interval. In other words, the amount of shrink time in the final schedule was 30 minutes, which is an 8 minute increase from the predicted 22 minutes of shrink time. In the example shown in FIG. 2A, the percent variance continues to increase throughout the work day.

Upon computing the percent variance for each 30 minute time interval throughout the day (as shown in FIG. 2A), the percent variance is assigned to a number interval category (as shown in the interval table 102 in FIG. 2B). The interval number category is shown for each file F1, F2, F3 of a particular day as a heading of the columns of the respective files F1, F2, F3. In an example, the assignment of the interval number category is accomplished by measuring the distance (in terms of time) from the time-stamp on the data file F1, F3, F3 to the interval, assigning the column a number representative of the distance. For example, for the 8:00 am data file F1, the first column of information is labeled "0", because the distance between 8:00 (the time stamp of data file F1) and 8:00 (the time associated with the first column) is zero. Similarly, for the 8:00 am data file F1, the second column of information is labeled "1", because the distance between 8:00 (the time stamp of data file F1) and 8:30 am (the second column) is 30 minutes or 1 interval. As such, in the interval table 102, the clock time (of FIG. 2A) is replaced with a numerical column heading starting at the number zero. It is to be understood that the number zero represents the then-current time interval, and the numbers that follow (i.e., 1, 2, 3, 4 . . . N) represent subsequent time intervals in sequential order. As such, for the 8:00 data file F1 the information (e.g., shrink time predicted, shrink time actual, and percent variance) pertaining to the time interval starting at 8:30 am is listed under column heading 1 (which is the interval category number), while the information pertaining to the time interval starting at 9:00 am is listed under column heading 2, and so on. At 8:30, the 8:30 time interval is the closest to the 8:30 data file F2, and thus the time interval for 8:30 is listed under column heading 0, and so on. As illustrated, 8:00 time interval is blank because the time associated with this interval has past.

The interval table 102 is generated during a subsequent work day, using the table 104 from the previous work day as the first file F1 (i.e., the data file for 8:00 am). The interval table 102 takes into account changes that occur on the actual day. For example, during the time interval of 8:00 am and 8:30 am, data files that are generated in real time of the activities of the advisors 62 during that work day are factored into the first row containing the predicted amount of shrink time in the next data file (e.g., F2 for the 8:30 am time interval). As such, when the next time interval starts (i.e., from 8:30 am to 9:00 am), the predicted shrink time in the first row of that file F2 will adjust based on any shrink time that was accumulated during the previous time interval (i.e., from 8:00 am to 8:30 am). This process continues for each time interval throughout the work day, thereby dynamically adjusting the predicted work schedule as the day progresses.

The information pertaining to the shrink activities used to formulate the tables shown in FIGS. 2A and 2B may, for example, be obtained either directly or indirectly from the call center advisor 62. For instance, the advisor 62 will notify his/her supervisor or other staffing personnel that he/she will be arriving to work late, leaving work early, etc. The supervisor enters the shrink-related information into the processor 84, which executes appropriate scheduling software programs that apply the information (along with other snap shots of schedule information from the advisor or one or more other advisors) to determine the graduated shrink ramp schedule.

Referring now to FIG. 2C, the results of the interval table 102 are organized in a summary table 106.

Similar data (as shown and described in reference to FIGS. 2A through 2C) is collected for each work day, and after a predetermined number days, a statistical analysis is performed (e.g., variance) using the summarized data. FIG. 2D shows a plurality of files labeled File 1, 2, 3 . . . 1440, where each of these files is a ramp schedule RS of predicted or anticipated shrink time for a particular time interval on a particular day. In the example shown in FIG. 2D, each work day includes 16 individual files, where each of these files represents a particular time interval (e.g., between 8:00 am and 8:30 am for File 1, between 8:30 am and 9:00 am for File 2, and so on) during a respective work day. For instance, Files 1 through 16 may represent ramp schedules RS for particular or designated time intervals throughout the first work day, and Files 17 through 32 (not shown) may represent ramp schedules for time intervals throughout a second work day. In the example shown in FIG. 2D, 1440 files representing shrink ramp schedules RS are generated (i.e., 16 files per day, for 90 days), and these files are used to determine the graduated shrink ramp schedule GSRS. Specifically, the data from the 1440 files may be assembled into a database (e.g., database 72) having a record for each of the 1440 files. The records may include 12 fields (shown as columns 0-11 in FIG. 2D), each field storing a value corresponding to a determined percent variance for a time interval in a sequence of time intervals. The graduated shrink ramp schedule GSRS may be a record in the database having 12 fields wherein each field stores an average of the values in corresponding fields from the 1440 records. Thus, the 0 field in the graduated shrink ramp schedule GSRS record would be an arithmetic mean of the 0 field of the 1440 records, and the 1 field in the graduated shrink ramp schedule record would be an arithmetic mean of the 1 field of the 1440 records, and so on for all of the 12 fields.

The foregoing process continues for a predefined number of days (e.g., 90 days) to create a shrink ramp schedule interval. In other words, new ramp schedules are created from all of the previous ramp schedules. Upon reaching the end of a predetermined period (e.g., a 90-day shrink ramp schedule interval), new ramp schedules are thereafter generated based, in part, on the data and ramp schedules RS of the previous 90 days, while any data and ramp schedules RS that are older than 90 days from the then-current day is not directly used in generating the newest ramp schedule RS and graduated shrink ramp schedule GSRS. For example, a ramp schedule generated on the $95^{th}$ day is determined from the ramp schedules of the $4^{th}$ day through the 94th day, while the ramp schedules from the 1st day through the $3^{rd}$ day is not directly factored in. However, it is to be understood that since the previous ramp schedules were developed using the $1^{st}$ through $3^{rd}$ days, and the daily ramp schedules are each calculated based on the graduated ramp schedule, the $95^{th}$ day's schedule is not independent of the $1^{st}$ through $3^{rd}$ days.

The graduated shrink ramp schedule GSRS may be used to plan or otherwise predict an amount of expected shrink time for each time interval remaining throughout a work day. In an example, the shrink factor (i.e., the amount of time (e.g., in terms of percentage) that is added/subtracted from the advisor's work schedule at a particular time interval) is applied to a predetermined number of advisors 62 previously scheduled to work during those remaining time intervals of that day in order to determine a net staffing (i.e., the number of advisors 62 that will remain after the shrink time is accounted for). The net staffing may be compared with a required staffing amount (i.e., the number of advisors 62 needed to deliver an appropriate level of service given a forecasted number of calls and an average handling time to service each call) to determine if adjustments need to be made. In instances where the net staffing is less than the required staffing amount, adjustments to one or more advisor schedules may be made.

While several examples have been described in detail, it will be apparent to those skilled in the art that the disclosed examples may be modified. Therefore, the foregoing description is to be considered exemplary rather than limiting.

The invention claimed is:

1. A method for staffing a call center, comprising:
by a processor at the call center running computer readable code embedded on a non-transitory, tangible computer readable medium:
creating a time-based, graduated shrink ramp schedule by:
generating a plurality of individual shrink ramp schedules, each of the plurality of individual shrink ramp schedules including a percent variance of shrink time computed from predicted and observed amounts of shrink time performed during a respective predetermined time interval of the work dam wherein the generating of the plurality of individual shrink ramp schedules includes generating a single individual shrink ramp schedule for each of a predetermined number of time intervals defined throughout each of a predetermined number of work days, the generating of the single individual shrink ramp schedule including:

comparing i) an amount of shrink time from a plurality of individual work schedules of the call center advisor, the plurality of individual work schedules being generated throughout the work day and each of the plurality of individual work schedules representing the predicted work schedule for the particular time interval of the work day, and ii) an amount of shrink time from the observed work schedule of the call center advisor for the particular time interval of the work day; and computing a percent variance of the compared shrink time for the particular time interval; and computing an arithmetic mean of the plurality of individual shrink ramp schedules, the arithmetic mean representing the time-based, graduated shrink ramp schedule;

generating a work schedule of the call center advisor for a then-current work day, the work schedule including i) information related to at least one planned activity, and ii) information related to at least one shrink activity forecasted from the time-based, graduated shrink ramp schedule, wherein the at least one shrink activity is an unplanned event; and in response to one or more occurrences of a shrink activity during the then-current work day, utilizing the time-based, graduated shrink ramp schedule to adjust the work schedule of the call center advisor throughout the remainder of the then-current work day, wherein an adjustment to the work schedule of the call center advisor includes an amount of time that is added or subtracted from the work schedule of the call center advisor at a particular time interval of the then-current work day.

2. The method as defined in claim 1 wherein the arithmetic mean is computed over a 90 day interval.

3. The method as defined by claim 1 wherein during the generating of the single ramp schedule, and after the computing of the percent variance, the generating of the single ramp schedule further includes assigning, by the processor, the percent variance for the particular time interval to a number interval category.

4. The method as defined in claim 3 wherein the comparing and the computing is accomplished for a plurality of time intervals, and wherein the method further comprises:

assigning, by the processor, the percent variance for each of the plurality of time intervals to a respective number interval category; and organizing, by the processor, the number interval category for each of the plurality of time intervals into the single individual shrink ramp schedule.

5. The method as defined in claim 1 wherein the computing of the percent variance is accomplished via equation (A):

$$\% = \left( \frac{Shrink_{Predicted} - Shrink_{Observed}}{Shrink_{Observed}} \right) \times 100. \quad \text{(Eqn. A)}$$

6. The method as defined in claim 1 wherein prior to the comparing, the method further comprises:

generating, by the processor sequentially throughout the work day, a plurality of data files representing the plurality of individual work schedules of the call center advisor, each of the plurality of data files including information related to at least one shrink activity performed by the call center advisor;

parsing, by the processor, the information related to the at least one shrink activity into the predetermined time intervals;

generating, by the processor, an other data file representing the completed work schedule performed by the call center advisor on the work day, the completed work schedule including further information related to the at least one shrink activity performed by the call center advisor; and parsing, by the processor, the further information related to the at least one shrink activity into the predetermined time intervals.

7. The method as defined in claim 1, further comprising:

by the processor, determining an appropriate number of call center advisors for the call center throughout a work day subsequent to the then-current work day; and by the processor, staffing the call center for the work day subsequent to the then-current work day based on the determining.

8. A system for staffing a call center, comprising:

a processor selectively and operatively associated with the call center, the processor including computer readable code embedded on non-transitory, tangible computer readable medium for:

creating a time-based, graduated shrink ramp schedule by:

generating a plurality of individual shrink ramp schedules, each of the plurality of individual shrink ramp schedules including a percent variance of shrink time computed from predicted and observed amounts of shrink time performed during a respective predetermined time interval of the work day, wherein the generating of the plurality of individual shrink ramp schedules includes generating a single individual shrink ramp schedule for each of a predetermined number of time intervals defined throughout each of a predetermined number of work days, the generating of the single individual shrink ramp schedule including:

comparing i) an amount of shrink time from a plurality of individual work schedules of the call center advisor, the plurality of individual work schedules being generated throughout the work day and each of the plurality of individual work schedules representing the predicted work schedule for the particular time interval of the work day, and ii) an amount of shrink time from the observed work schedule of the call center advisor for the particular time interval of the work day; and computing a percent variance of the compared shrink time for the particular time interval; and computing an arithmetic mean of the plurality of individual shrink ramp schedules, the arithmetic mean representing the time-based, graduated shrink ramp schedule;

generating a work schedule of the call center advisor for a then-current work day, the work schedule including i) information related to at least one planned activity, and ii) information related to at least one shrink activity forecasted from the time-based, graduated shrink ramp schedule, wherein the at least one shrink activity is an unplanned event; and in response to one or more occurrences of a shrink activity during the then-current work day, utilizing the time-based, graduated shrink ramp schedule to adjust the work schedule of the call center advisor throughout the remainder of the then-current work day, wherein an adjustment to the work schedule of the call center advisor includes an amount of time that is added or subtracted from the work schedule of the call center advisor at a particular time interval of the then-current work day; and the call center staffed by a plurality of advisors each having a respective work schedule.

9. The system as defined in claim 8 wherein the processor further includes computer readable code for:

assigning the percent variance for the particular time interval to a number interval category.

10. The system as defined in claim 8 wherein the computing of the percent variance is accomplished via equation (A):

$$\% = \left( \frac{Shrink_{Predicted} - Shrink_{Observed}}{Shrink_{Observed}} \right) \times 100. \quad \text{(Eqn. A)}$$

11. The system as defined in claim 8 wherein the processor further includes computer readable code for:

generating, sequentially throughout the work day, a plurality of data files representing the plurality of individual work schedules of the call center advisor, each of the plurality of data files including information related to at least one shrink activity performed by the call center advisor;

parsing the information related to the at least one shrink activity into the predetermined time intervals;

generating an other data file representing the completed work schedule performed by the call center advisor on the work day, the completed work schedule including further information related to the at least one shrink activity performed by the call center advisor; and parsing the further information related to the at least one shrink activity into the predetermined time intervals.

12. The system as defined in claim 8 wherein the processor further includes computer readable code for:

determining an appropriate number of call center advisors for the call center throughout a work day subsequent to the then-current work day; and staffing the call center for the work day subsequent to the then-current work day based on the determining.

* * * * *